US012345074B2

(12) United States Patent
Moon et al.

(10) Patent No.: US 12,345,074 B2
(45) Date of Patent: Jul. 1, 2025

(54) STATE MONITORING LOCKSET

(71) Applicant: Townsteel, Inc., City of Industry, CA (US)

(72) Inventors: Charles W. Moon, Colorado Springs, CO (US); Chad P. Moon, Colorado Springs, CO (US); Sybor Ma, La Puente, CA (US)

(73) Assignee: Townsteel, Inc., City of Industry (CA)

( * ) Notice: Subject to any disclaimer, the term of this patent is extended or adjusted under 35 U.S.C. 154(b) by 237 days.

(21) Appl. No.: 17/387,947

(22) Filed: Jul. 28, 2021

(65) Prior Publication Data

US 2022/0034125 A1 Feb. 3, 2022

Related U.S. Application Data

(60) Provisional application No. 63/059,422, filed on Jul. 31, 2020.

(51) Int. Cl.

| | |
|---|---|
| ***E05B 55/00*** | (2006.01) |
| ***E05B 3/06*** | (2006.01) |
| ***E05C 1/16*** | (2006.01) |

(52) U.S. Cl.

CPC ............ *E05B 55/005* (2013.01); *E05B 3/065* (2013.01); *E05C 1/163* (2013.01)

(58) Field of Classification Search

CPC .......... E05B 55/00; E05B 55/005; E05B 3/00; E05B 3/04; E05B 3/06; E05B 3/065; E05B 15/00; E05B 15/04; E05B 15/101; E05B 2015/0403; E05B 17/2026; E05B 2045/065; E05B 2045/068; E05C 1/00; E05C 1/002; E05C 1/08; E05C 1/058; E05C 1/10; E05C 1/16; E05C 1/163; E05C 19/00; E05C 19/06; E05C 19/063

USPC ........................................................... 70/224

See application file for complete search history.

(56) References Cited

U.S. PATENT DOCUMENTS

| | | | | |
|---|---|---|---|---|
| 6,363,763 | B1 * | 4/2002 | Geringer | E05B 45/12 70/432 |
| 2013/0239631 | A1 * | 9/2013 | Moon | E05B 55/005 70/266 |
| 2014/0196509 | A1 * | 7/2014 | Moon | E05B 17/2092 70/1.5 |
| 2015/0315816 | A1 * | 11/2015 | Gopalakrishnan | E05B 63/06 70/344 |

* cited by examiner

*Primary Examiner* — Nathan Cumar
(74) *Attorney, Agent, or Firm* — Eric W. Cernyar

(57) ABSTRACT

The standard spring retainer for a retract slide is upgraded in three embodiments. In the first embodiment, a first switch mounted on the upgraded spring holder is activated when the latch is retracted (from either side of the lock). In the second embodiment, the first switch is activated when either the latch is retracted or the latch bolt is pushed in by the latch hitting the strikeplate as the door is closing. A spring carrier/switch activator is added to the retract slide that is pushed back by the latch tailpiece. In the third embodiment, two switches monitor up to four conditions—when the door is open, closing, and closed and when the latch is being retracted by the inner or outer handle.

15 Claims, 9 Drawing Sheets

STATE MONITORING LOCKSET

RELATED APPLICATIONS

This application claims the benefit of U.S. Provisional Patent Application No. 63/059,422, filed Jul. 31, 2020, entitled "Retract Slide Activated Door Ajar Sensors," which is herein incorporated by reference.

TECHNICAL FIELD

This application relates to smart locks, and more particularly to locks that detect a position (open, shut, and/or ajar) of the door or state (e.g., retracted) of the retract slide, latchbolt, and/or deadlocking plunger.

BACKGROUND

U.S. Pat. No. 6,363,763 to Geringer et al. discloses a latch-position detecting cylindrical lockset in which a switch (24, 80 or 120) is mounted on an inside of a bracket (56) or other portion of the retractor chamber or housing (14, 44, 68). When the latch (20) or latch retractor (54) is retracted, a pin (32, 102) or magnet (128) affixed to the latch (20) or retractor (54) comes into contact (or proximity in connection with the magnet (128) with switch (24, 80, or 120), closing the electrical circuit.

U.S. Patent Pub. No. 2006/0192396 to Frolov et al. discloses a latch-position detecting cylindrical lockset having a reed switch sensor (14) with a first member (15A) fixedly disposed within a cylindrical block (28) that houses the retractor (5) and a second member (15B) coupled with the latch (12).

These prior art embodiments, however, contain only a single switch that detects only whether the latch is retracted. The prior art's embodiments, moreover, do not contain the switch within an easily replaceable retract slide assembly. This renders those embodiments generally unsuitable for upgrading or retrofitting existing locksets.

SUMMARY

An embodiment of a lockset with a latch-position sensing and retract slide assembly is provided. The lockset comprises a chassis sized to fit within a bore of a door, a retract slide, a spring retainer, a first sensor (which may be a switch) mounted on the spring retainer, and one or more latch springs held between the retract slide and the spring retainer. The retract slide is operatively connected to a latchbolt and mounted in the chassis for movement between latch-retracting and non-latch-retracting positions. A first signal activator is formed on or carried by the retract slide between sensor-activating and sensor-deactivating positions. When the retract slide is operated to retract the latch, the first signal activator moves between the sensor-activating and sensor-deactivating positions, thereby interacting with the first sensor to indicate that a latch of the door is in a retracted state.

In a second embodiment, the first spring carrier is positioned between the retract slide and the spring retainer. Also, the first signal activator carried by the retract slide is formed as part of or operatively connected to the first spring carrier. The first spring carrier is operable to be driven by two independent mechanisms. The first mechanism is manual operation of a door handle to drive the retract slide into the spring-compressing position. Retraction of the retract slide moves the first spring carrier along with its first signal activator into a position that activates the first sensor. The second mechanism is depressing the latchbolt and by extension, its tailpiece and tailpiece base, which presses against an extension of the first spring carrier, driving the spring carrier and its first signal activator into a switch-activating position. This more completely indicates that the latch of the door is in a retracted state.

In a third embodiment, a second sensor is mounted on the spring retainer. A second spring carrier is positioned between the retract slide and the spring retainer. The spring carrier is operable to be driven with the retract slide or independently of the retract slide by a deadlock plunger into a spring-compressing position. The second spring carrier includes or bears a second signal activator that interacts with the second sensor when the deadlock plunger is pressed inward to indicate that the deadlock plunger is pressed inward.

Embodiments for an upgrade kit for a purely mechanical cylindrical door lockset are also provided. A first upgrade kit embodiment, when installed, transforms the purely mechanical cylindrical door lockset into a lockset consistent with the first lockset embodiment described above. A second upgrade kit embodiment, when installed, transforms the purely mechanical cylindrical door lockset into a lockset consistent with the second lockset embodiment described above. A third upgrade kit embodiment, when installed, transforms the purely mechanical cylindrical door lockset into a lockset consistent with the third lockset embodiment described above.

The first upgrade kit embodiment comprises a replacement spring retainer, platform, sensor, and sensor activator. It may also comprise a replacement retractor and/or a carrier that rides on the replacement retractor. The replacement spring retainer is configured to replace a pre-existing spring retainer of the cylindrical lockset. The platform is configured to mount to or formed as a part of the replacement spring retainer. The platform is also configured to secure one or more position-sensing sensors, which are complementarily configured to be secured to the platform. The sensor activator is configured to be assembled to a pre-existing retract slide of the cylindrical lockset, to a replacement retract slide included in the upgrade kit, or to a carrier included in the upgrade kit. When assembled to the cylindrical door lockset, the sensor activator is operative to move within a tailpiece slot of the pre-existing or replacement retract slide between sensor-activating and non-sensor-activating positions.

In one implementation, the sensor activator is connected to a contact that is configured for contact with a latch tailpiece of the cylindrical lockset so that depression of the latch pushes the first sensor activator into a position sensed by the first sensor.

The second upgrade kit embodiment includes the components of the first upgrade kit and further comprises a carrier configured to ride the pre-existing or replacement retract slide and press and relax a latch spring that is oppositely secured by the spring retainer between compressed and relatively decompressed positions. When assembled to the previously purely mechanical cylindrical door lockset, the carrier connects the first sensor activator to a contact that is configured for contact with a latch tailpiece of the cylindrical lockset so that depression of the latch pushes the first sensor activator into a position sensed by the first sensor. The first sensor activator is supported on or formed as a part of the carrier, and the contact either attaches to or is formed as a part of the carrier. Retraction of the pre-existing or replacement retract slide forces the carrier and first sensor activator to move with it into a sensor-activating position. Depression of the latch also forces the first sensor activator into a sensor-activating position.

The third upgrade kit embodiment includes the components of the second upgrade kit and further comprises a second position-sensing sensor configured to be secured to the platform, a second carrier, and a second spring activator. The second carrier is configured to ride the pre-existing or replacement retract slide and press and relax latch springs that are oppositely secured by the spring retainer between compressed and relatively decompressed positions. The second spring activator—like the first spring activator—is configured to be assembled to a pre-existing retract slide of the cylindrical lockset, to a replacement retract slide included in the upgrade kit, or to a carrier included in the upgrade kit. When the third upgrade kit is installed, the second spring activator is connected to a second contact that is configured for contact with a deadlocking plunger of the cylindrical lockset so that depression of the deadlocking plunger pushes the second sensor activator into a position sensed by the second sensor. Moreover, the second carrier connects the second sensor activator to the second contact, the second sensor activator is supported on or formed as a part of the second carrier, and the second contact is either secured to or is formed as a part of the second carrier. Retraction of the pre-existing or replacement retract slide forces the second carrier and second sensor activator to move with it into a sensor-activating position. Also, depression of the deadlocking plunger also forces the second sensor activator into a sensor-activating position.

Other systems, devices, methods, features, and advantages of the disclosed product, kits, and methods for forming a double latch lockset and parts of locksets will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

DETAILED DESCRIPTION

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

In describing preferred and alternate embodiments of the technology described herein, as illustrated in FIGS. 1-23, specific terminology is employed for the sake of clarity. The technology described herein, however, is not intended to be limited to the specific terminology so selected, and it is to be understood that each specific element includes all technical equivalents that operate in a similar manner to accomplish similar functions.

The drawings herein describe or provide context for several embodiments of smart locksets that feature one or more of the following characteristics: (1) they detect a physical state (e.g, open, closed, ajar, retracted, projected, depressed) of the door, the latchbolt, the retract slide, and/or the deadbolt plunger (2) using switches or sensors that are installed on a spring retainer (3) which are configured to retrofit pre-existing locks. For purposes of brevity, these embodiments are described as implemented within a cylindrical lockset.

Figure 1:
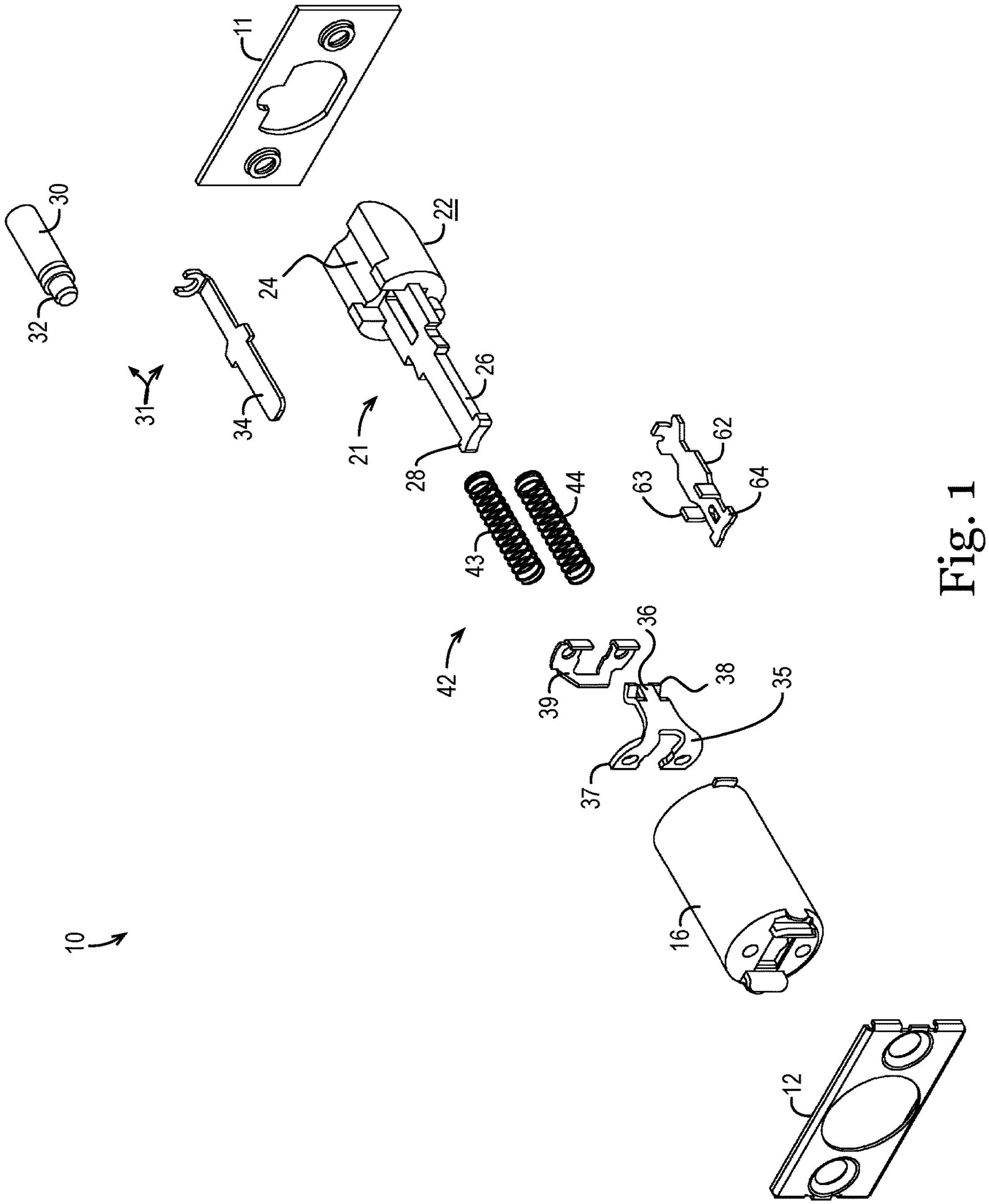
FIG. 1 is an exploded view diagram of a latch assembly.

To provide context for the cylindrical lockset, FIG. 1 presents an exploded view of one embodiment of a latch assembly 10 for installation in an edge bore of a door. The latch assembly 10 comprises a latchbolt assembly 21, a deadlock assembly 31, a spring assembly 42, a housing 16, and a face and stake plate assembly. The latchbolt assembly 21 comprises a latchbolt 22 and a tailpiece 26 which terminates in a tailpiece base 28 that protrudes out of an end of the housing 16. The deadlock assembly 31 comprises a deadlocking plunger 30, a post 32 for mounting a spring (or a spring-biased button 32), and a deadlocking (DL) bar 34. The spring assembly 42 comprises a DL plunger-biasing spring 43 and a latch-biasing spring 44. The spring 43 is mounted between the blocker activator 38 and the button 32 of the deadlocking plunger 30. The spring 44 is mounted along the DL bar 34 between the blocker activator 38 and a post (mostly obscured from view) on the backside of the latchbolt 22, underneath the tailpiece 26. The face and stake plate assembly comprises a stake plate 12 that slides over housing 16 and is staked to a face plate 11.

The latchbolt assembly 10 also comprises a DL blocker lever 35, which comprises an effort 37 where input force is exerted on the DL blocker lever 35, a curved section that serves as a fulcrum, a blocker 36 positioned to come into blocking contact with the tailpiece base 28, and a ramp 38. A DL override 62 is attached to the tailpiece 26 using a detent and tabs 63 that secure the DL override 62 to the tailpiece 26.

When the deadlocking plunger 30 is depressed, force is exerted by spring 43 on blocker activator 38 and then to effort 37 of the DL blocker lever 35. The effort force pivots the blocker 36 into a position that interferes with retraction of the tailpiece base 28. To overcome this blockage, a retract slide is used to retract not only the tailpiece 26, but also the DL override 62. As the fin 64 of the DL override 62 comes into contact with one of the ramps 38 of the DL blocker 35, it forces the blocker 36 out of the way, enabling the latchbolt 22 to retract again.

When assembled, the deadlocking plunger 30 is constrained for travel in a channel 24 of the latchbolt 22. True to convention, the deadlocking plunger 30 is forced to retract when the latchbolt 22 retracts. When a door is closed, the latchbolt 22 springs back into a projected position in the jamb hole (aka strikeplate hole) prepared for the latchbolt 22. The strikeplate of the door (not shown) prevents the deadlocking plunger 30 from also projecting into the jamb hole. When the deadlocking plunger 30 is depressed (retracted), the blocker lever 35 blocks the latchbolt 22 from retracting. This frustrates certain types of attacks, such as inserting a plastic card between the latchbolt and the doorjamb in an effort to force the door open.

The conventional details of a deadlocking plunger's mechanics are already readily familiar to ordinarily skilled artisans. There are many other types of deadlocking plunger configurations, and the advantages of the present invention are applicable to most of them.

Figure 2:
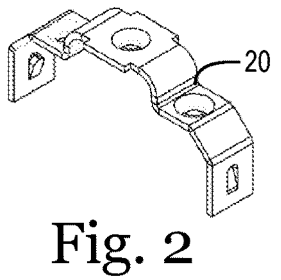
Fig. 2 Prior Art
FIG. 2 is a perspective view of a prior art spring retainer for springs that bias a conventional retract slide.
Figure 3:
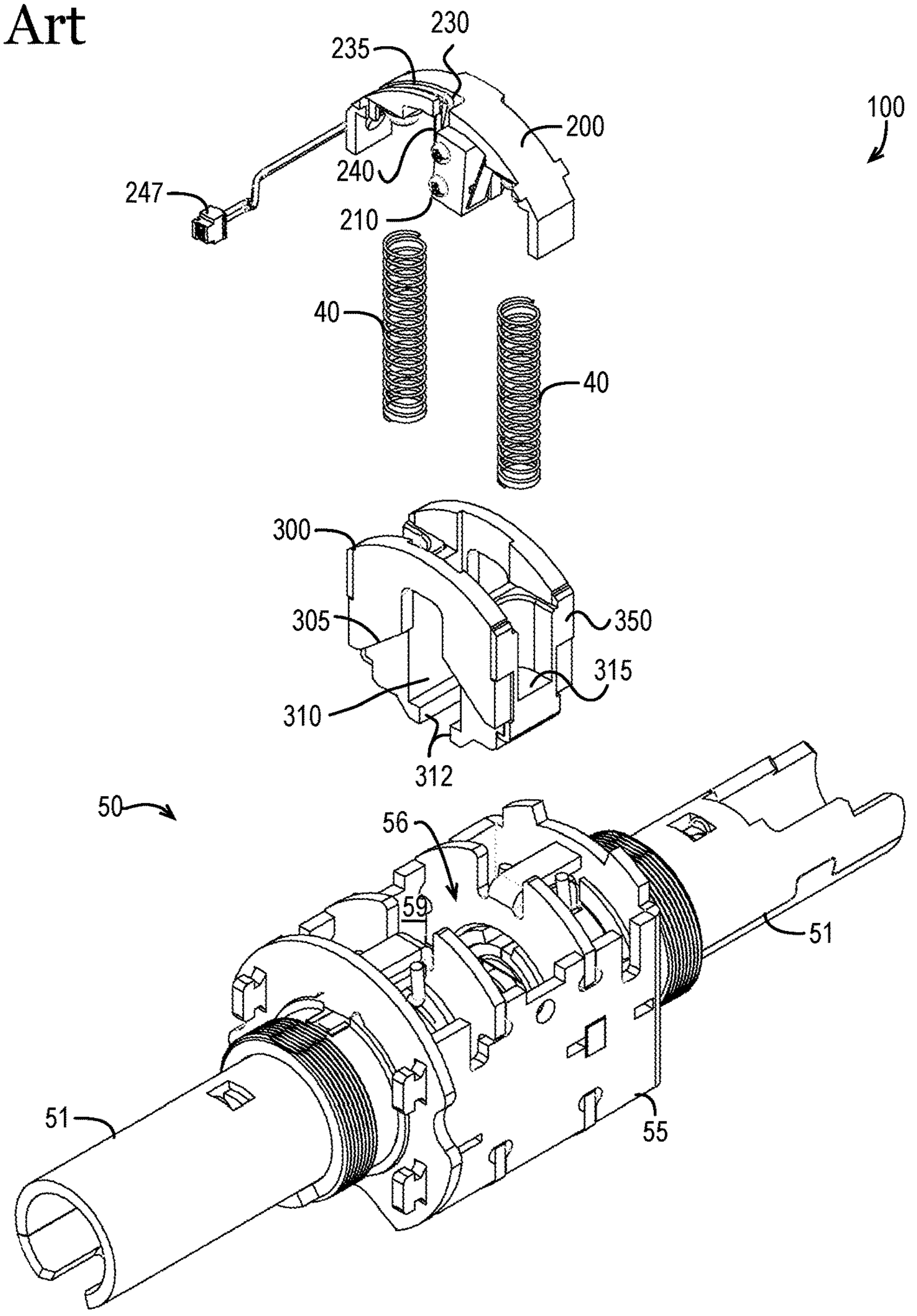
FIG. 3. is an exploded view of a latchset incorporating a retract slide and novel spring retainer.

FIG. 3 is an exploded view of one embodiment of a cylindrical lockset 100 comprising a lock chassis assembly 50, a retract slide 300, retract slide biasing springs 40, and a spring retainer 200 (aka spring clip or spring holder) that contains one or more switches or sensors for detecting the status of the latch retractor. For contrast with the spring retainer 200, which is novel, FIG. 2 illustrates a prior art retract slide spring retainer 20 which contains no such switches or sensors.

In the depicted embodiment of a cylindrical lockset 100, the lock chassis assembly 50 is like one illustrated in in U.S. Pat. No. 9,528,300, issued Dec. 27, 2016, which is herein incorporated by reference for all purposes. The lock chassis assembly 50 comprises inside and outside spindles 51 and a multi-compartment cage or chassis 55. The middle compartment 56 of the chassis 55 houses the retract slide 300, which is operated by cam activators formed from or attached to each spindle 51.

The retract slide 300 is, if necessary, modified from a prior art design to provide a sensor or switch activator 350 (hereinafter referred to as a signal activator) in the form of a bar, wall, shoulder, flange, pin, or protuberance. Alternatively, the signal activator 350 is provided on a component—such as a spring carrier 320 or 330 (FIGS. 7, 10, 17)—that rides on the retract slide 300. If necessary, the retract slide 300 is modified from a prior art design to accommodate the spring carriers. The signal activator 350 only actively engages the switch/sensor when the retract slide 300 is in a retracted position.

In other aspects, the retract slide 300 is conventional. The retract slide 300 transfers latch retracting motion from the spindles 51 to the jaws 312 to the latch tailpiece base 28, pulling the latch tailpiece 26 inward to retract the latchbolt 22. The retract slide 300 may comprise slide cam surfaces 305 that are engaged by bent-up, ear-like retractor activation cams (not shown) on the inner and outer spindles 51. An end of the latch tailpiece—referred to herein as the tailpiece base 28—travels and is retained in a slot 310 in the midsection of the retract slide 300 that allows the latch tailpiece 26 to travel inwardly even when the retract slide is in a non-retracting position.

The spring retainer 200 provides a platform 240 (FIG. 21) with one or two pairs of posts 242, holes, or other couplings for mounting one or two switches or sensors, such as first sensor 210 and second sensor 220. Each switch or sensor is complementarily configured to be secured to the platform 240 and is connected by wires 230 to a standard electrical connector, signal detection circuit, or transmitter. FIG. 3 shows spring retainer 201 with wires 230 that terminate in a wireless transmitter or connector 247. While no transmitters, or connectors are shown in FIGS. 18-23, which provides a more detailed view of a spring retainer 203, that embodiment should be understood to include either an electrical connector or a wireless transmitter.

In one implementation, the platform 240 provides a compartment for holding a small battery to power the transmitter or signal detection circuit. Wires 230 travel from the platform 240 to the channel 235 and along the channel 235 to a connector or transmit antenna 247. In a signal detection circuit implementation, a record of state changes is maintained in a memory cell installed on the platform 240 and then transmitted or otherwise conveyed to a monitoring device brought into contact or proximity with the door.

The spring retainer 200 is formed as a cap that fits onto the chassis 55 and that, together with the chassis 55, forms a chamber that retains the retract slide 300. Advantageously, the spring retainer may be formed as a stamped piece with two spring-retaining ends and a platform 240; wherein the switch 210 and/or 220 is/are mounted on the platform 240.

For completeness, it is noted that the left and right compartments of the chassis 55 house return springs that return the spindles 51 and the knobs or levers attached thereto to their respective default positions. The invention is not limited to this embodiment or to other embodiments that utilize a multi-compartment chassis or that house return springs in the door bore. Indeed, it is expected that the invention may be adapted to a wide variety of pre-existing door latchsets that utilize a retract slide or equivalent.

Three Embodiments

Attention is now focused on the signal activation mechanism of three distinct embodiments of the lockset 100 in which one or more switches and/or sensors are mounted on a spring retainer. Because there are structural differences between the locksets 100 of each of the three different embodiments, the first, second, and third embodiments features locksets 100 denoted by reference numbers 101, 102, and 103, respectively, spring retainers 200 denoted by reference numbers 201, 202 and 203, respectively, and retract slides 300 denoted by reference numbers 301, 302 and 303, respectively. References 100, 200, and 300 are intended to refer generally to any of the locksets, spring retainers, or retract slides, respectively, described herein.

Before describing further, it is important to emphasize that the normally open lever switches depicted in the drawings are just a simple, practical and economical implementation of a sensor, but other implementations are possible. Another type of switch (e.g., a normally closed switch) or sensor (e.g., an inductive, optical, capacitive, magnetic, ultrasonic, or other proximity sensor) could replace any of the depicted switches.

1. Detecting Retractor Slide Position

Figure 4:
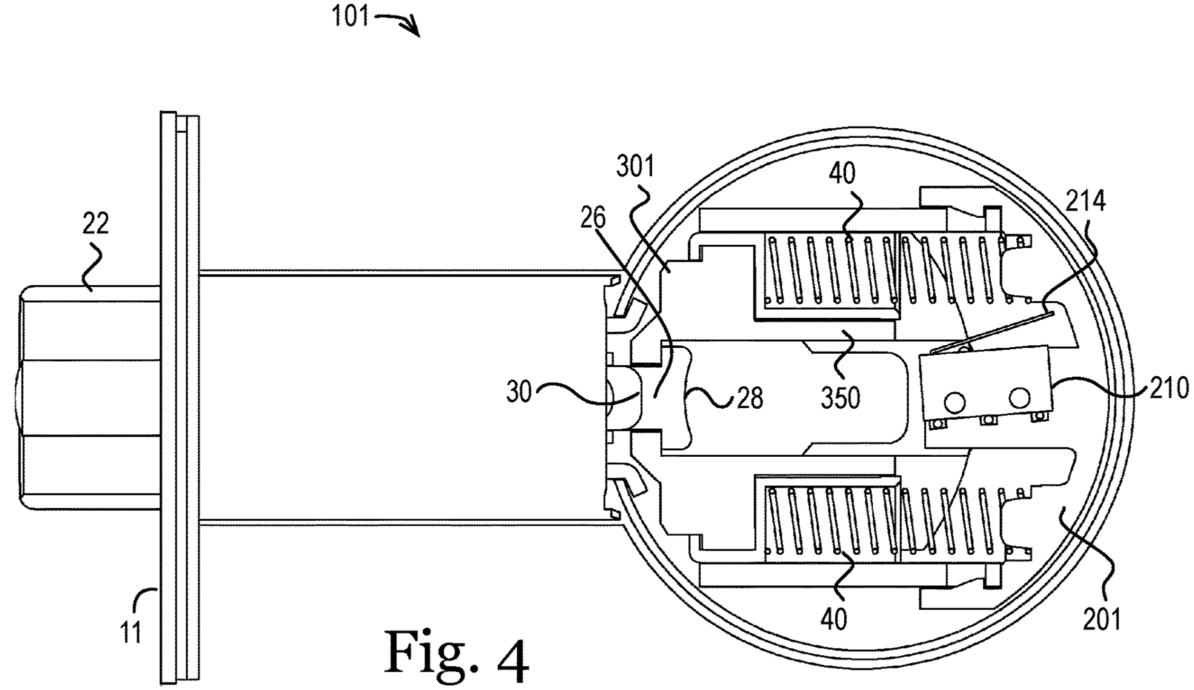
FIG. 4 is a cross-sectional view of a retract slide and spring retainer assembly according to a first embodiment, in a configuration wherein the latchbolt has been manually retracted by operation of a door handle.
Figure 5:
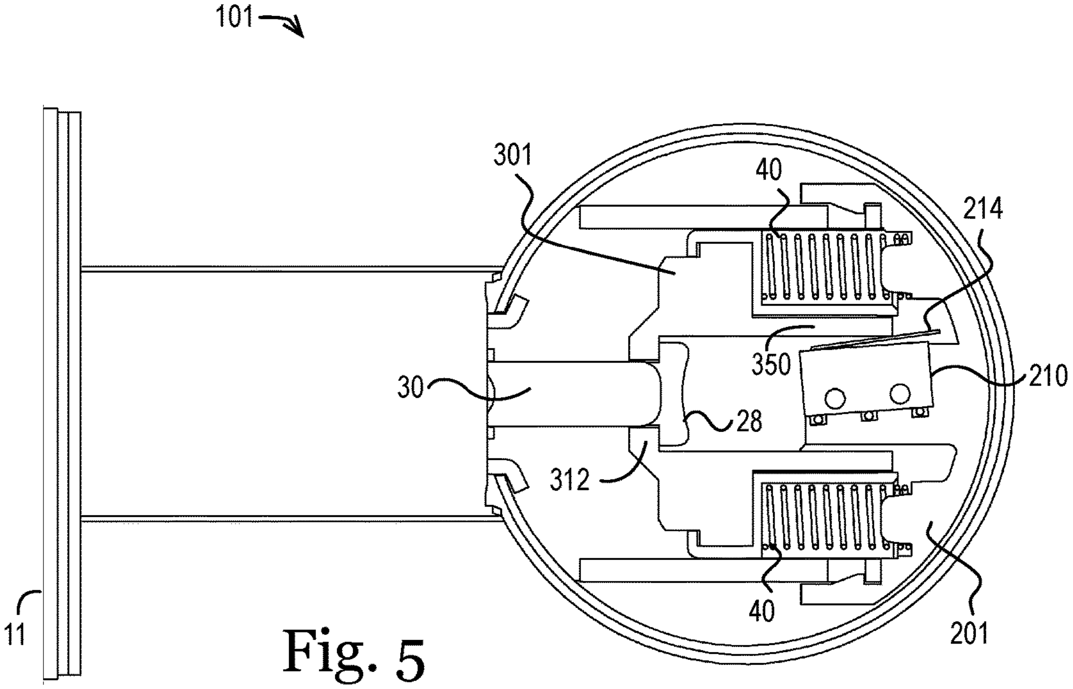
FIG. 5 is a cross-sectional view of the retract slide and spring retainer assembly of FIG. 4, wherein the latchbolt has been manually retracted by operation of a door handle.

Cut-away views in FIGS. 4 and 5 illustrate the retract-slide-position-sensing lockset 101 with a switch 210 that detects whether the retract slide 301 is being operated to retract the latchbolt 22. FIG. 4 shows the retract slide 301 in a default, non-latch-retracting position. FIG. 5 shows the retract slide 301 in a latch-retracting position that compresses the springs 40.

Noted structural features include a spring retainer 201, a switch 210 mounted on the spring retainer 201, a lever 214 mounted on the switch 210, and a signal activator 350 in the form of what appears to be (but need not be) a long, slender signal activator arm or shoulder formed as part of the retract slide 301. Also shown are a tailpiece base 28 connected to tailpiece 26 and the jaws 312 of the retract slide 301. The spring retainer 201 is configured with an arcuate outer profile to conform to and rest against an inside of a cylindrical housing that encloses the chassis 55 that holds the retract slide 301. It performs not only the traditional function of retaining springs 40 that bias the retract slide 301 towards its default position, but also the novel function of supporting a switch or sensor 210 that detects the position of the retract slide 301.

In operation, a door handle (e.g., lever or knob) is operated to retract the latchbolt 22. Motion of the door handle is transferred to the retract slide 301, whose jaws 312 pull the tailpiece base 28 back, thereby retracting the latchbolt 22 and compressing the springs 40. As the retract slide 301 moves back, its signal activator 350 moves back with it, coming into contact with and ultimately depressing lever 214, closing or opening a circuit depending on whether the switch is normally opened or normally closed.

When the door handle is released, the springs 40 decompress, forcing the latchbolt 22 into the projected position and the retract slide 301 into the default position. This, in turn, withdraws the signal activator 350 from contact with the switch 210.

Advantageously, the switch or sensor 210 is mounted on the spring retainer 203, which can be contoured to retrofit pre-existing locks, upgrading them from standard mechanical locks to smart locks that detect operation of the door handles. This is done by replacing the pre-existing spring retainer 20 with an upgraded spring retainer 200 or 201. Additional replacement of the retract slide may or may not be required.

It should be noted that in this first embodiment, the lockset 101 only detects latch retraction caused by operation of the retract slide 301. The latchbolt 22 could be depressed (pushed into a retracted position) by hitting a door strike without entering the strikeplate hole. When the strikeplate pushes the latchbolt 22 into a retracted position, the tailpiece base 28 travels inwardly, within a retract slide channel 310 (FIG. 10), without engaging the retract slide 300.

2. Detecting Whether Latch is Retracted

Figure 6:
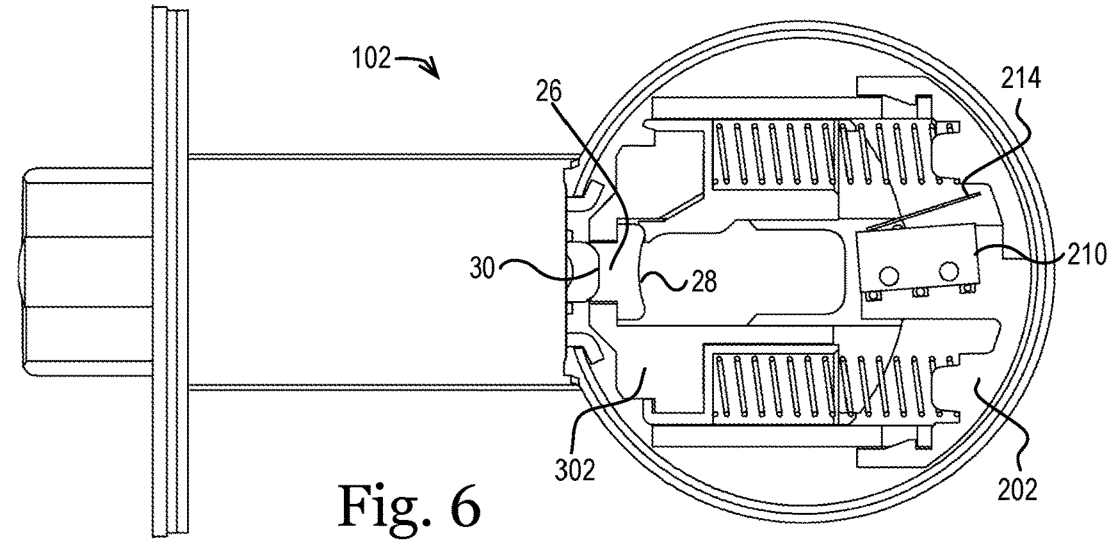
FIG. 6 is a cross-sectional view of a retract slide, spring carrier and spring retainer assembly according to a second embodiment, in a configuration wherein the latchbolt has been retracted either by operation of the door handle or by pressure exerted directly against the latch bolt.
Figure 7:
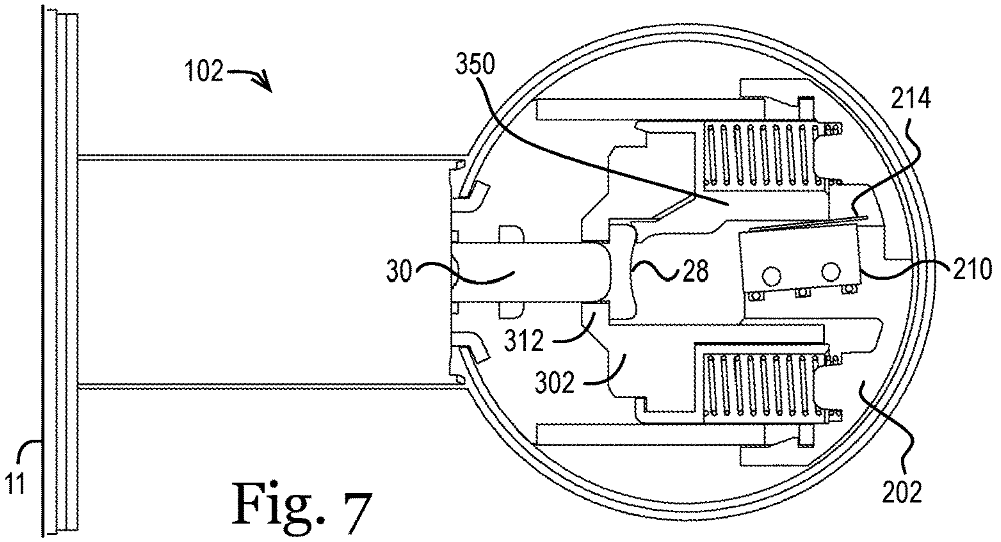
FIG. 7 is a cross-sectional view of the retract slide, spring carrier, and spring retainer assembly of FIG. 6, in a configuration in which the latchbolt has been retracted by operation of the door handle.
Figure 8:
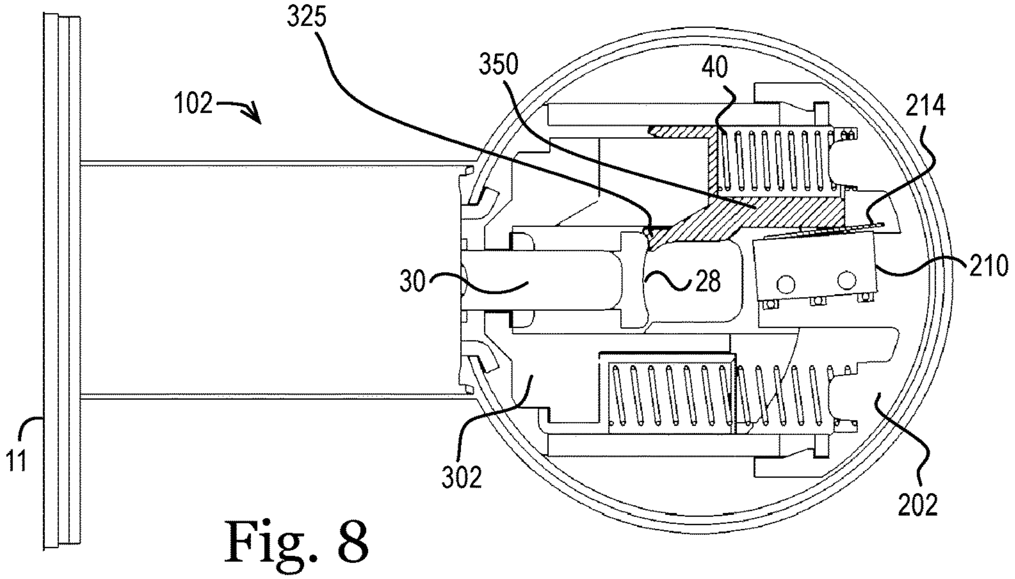
FIG. 8 is a cross-sectional view of the retract slide, spring carrier, and spring retainer assembly of FIG. 6, in a configuration in which the latchbolt has been retracted by pressure directly against the latchbolt (as by a strikeplate as the door is closing or while the door is ajar), not by operation of the door handle.
Figure 9:
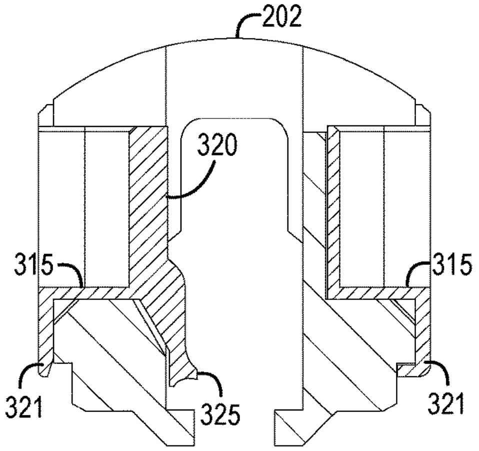
FIG. 9 is a plan view of a the retract slide, spring carrier, and spring retainer assembly of FIG. 6, with widely spaced hatch lines illustrating the retract slide and densely spaced hatch lines illustrating the two spring carriers.
Figure 10:
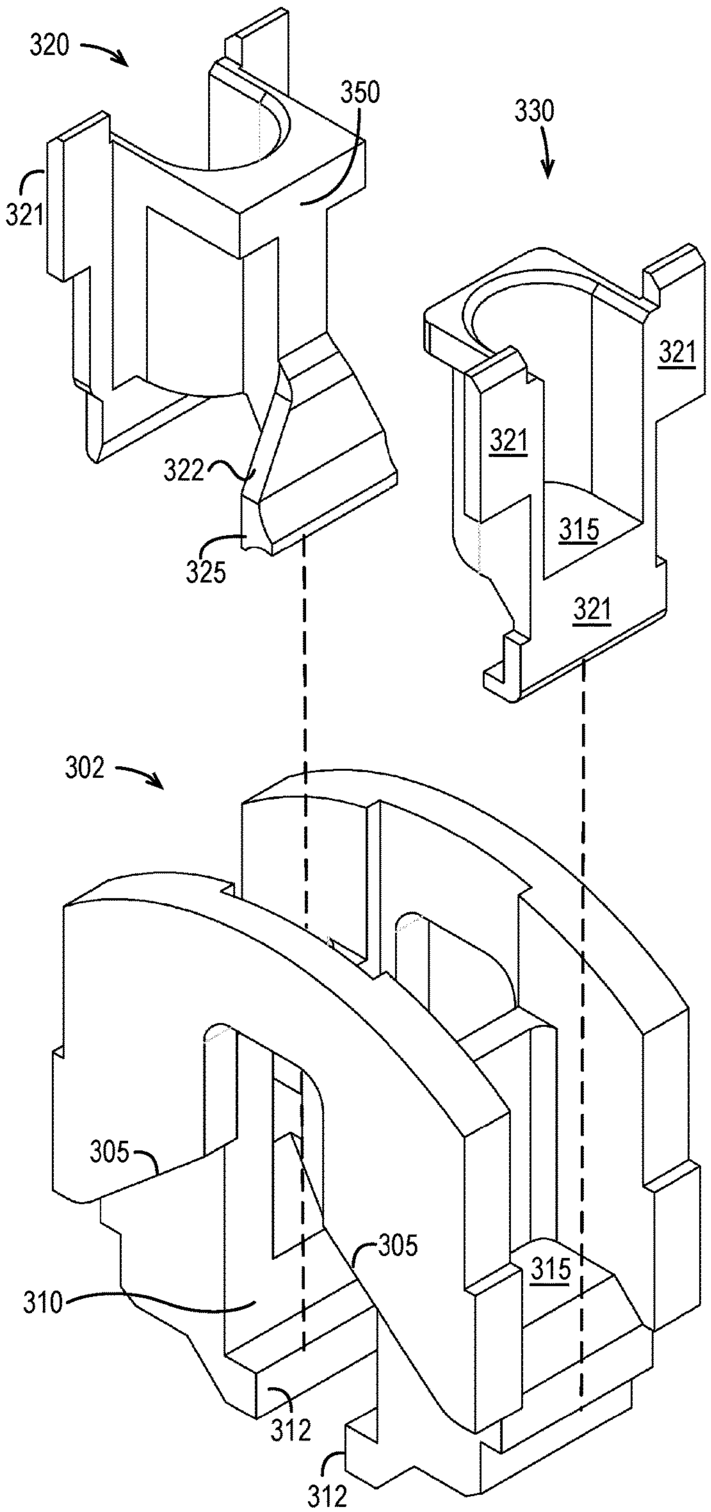
FIG. 10 is a perspective view of the retract slide of FIG. 6 along with two spring carriers.

FIGS. 6-8 are cut-away views of a second lockset 102. Unlike the first lockset 101, the switch 210 of the second lockset 102 detects latch retraction whether caused by a retract slide 302 operating on the tailpiece base 28 or a strikeplate, finger, or other contact pushing the latchbolt 22 inwards directly. A significant structural difference between the first and second locksets 101 and 102 is the use, in the second lockset 102, of a modified retract slide assembly comprising a retract slide 302, a major spring carrier 320, and a minor spring carrier 330. FIGS. 9-10 illustrate these three components. The major spring carrier 320 is configured to ride on the retract slide 302 between one of the springs 40 and the spring seat 315.

FIG. 6 shows the retract slide 302 in a default, non-retracting position. FIG. 6 also shows the latch 22 in its default projected position. FIG. 7 shows the retract slide 302 in a latch-retracting position. FIG. 8 shows the retract slide 302 in its default, non-retracting position, but the latch 22 itself in a retracted position.

The spring carriers 320 and 330 are provided on either side of the tailpiece slot 310 to seat compression springs 40 that bias the retract slide 300 into a latch-extending position. The spring carriers 320 and 330 might be more precisely called "spring-end carriers," but the term "carrier" herein is meant in a broad sense in that it carries a part of the spring for some type of motion. As used herein, "carrier" does not require translation of the entire spring 40.

The chief purpose of the major spring carrier 320 is to activate the sensor 210 not only when the retract slide 302 is retracted but also when the latchbolt 22 is depressed. When the retract slide 302 is retracted, as illustrated in FIG. 7, the major spring carrier 320 is forced to retract backwardly in unison with retract slide 302. As the retract slide 302 retracts, a signal activator 350 (which may be a wall, projection, impingement member, or any other suitable form) depresses the lever 214 of the switch 210, closing a circuit. Upon release of the door handle causing the retraction, the opposing orientation of the spring 30 against the major spring carrier 320 causes the latter (along with its signal activator 350) to move forward in unison with the retract slide 302 and latchbolt 22 (as shown in FIG. 6)—unless something is obstructing the spring carrier 320 from returning to its default position. A planar guide surface or appendage 321 constrains the spring carrier 320 for linear travel along a wall 59 of the lock housing 55 (FIG. 3) between spring-compressing and spring-decompressing positions.

As shown in FIG. 8, the spring carrier 320 can be urged into its retracted position by the tailpiece base 28 independently of the retract slide 302. This may occur when the latchbolt 22 is pressed against the strikeplate or if a person is manually depressing the latchbolt 22. The spring carrier 320 has a leg 322 that descends from a spring seat 315 of the spring carrier 320 into the tailpiece slot 310 of the retract slide 302. The leg 322 terminates at a foot 325 that rests on a rear-facing surface of the tailpiece base 28.

The spring retainer 202 fixes the opposite ends of the biasing springs 30 next to the lock housing 55 and opposite the latchbolt 22. The spring retainer 202 is oriented so that its switch lever 214 is oriented toward the same side of the retract slide 302 as the switch 210, in the path of activator 350.

The minor spring carrier 330 sits on the other side of the retract slide 302 from the major spring carrier 320. The minor spring carrier 330 is fixed to the retract slide 302 and does not have a leg 322 or foot 325 that descends into the tailpiece slot 310 of the retract slide. The purpose of the minor spring carrier 330—which can be formed from an injection molded material that snaps into place—is merely to provide a low friction glide surface for the corresponding spring 40. It does not provide a lock or switch-state determining function and its low friction purpose could be provided by the retract slide 302 itself.

In operation, a door equipped with latchset 302 is partially closed. Contact with the strikeplate pushes the latchbolt 22 in, and with it, the tailpiece 26 and tailpiece base 28. FIG. 8 illustrates the position of the tailpiece base 28 within the tailpiece slot 310. The retractor 302 is still in its default position. Because the tailpiece base 28 pushes against the foot 325 of the spring carrier 320, the spring carrier 320 is forced back. The signal activator 350 depresses the switch lever 214. The spring seat 315 of the spring carrier 320 compresses the spring 40.

These aspects of the lockset 102 mean that the switch or the sensor 210 always senses the position of the spring seat 315, whether urged backwards (from the borehole) by the retract slide 302 or by external depression of the latchbolt 22. Here, a retracted retract slide 302 indicates either that the door is being operated for ingress or egress, the door is hung up on the strikeplate, just shy of being fully shut, or something or someone (e.g., a child) is playing with the latchbolt 22. Analysis of this data over time provides useful clues about access attempts and may provide a predicate for different types of alarms.

The lockset 102 also enjoys one of the advantages of lockset 101—the placement of switch or sensor 210 on the spring retainer 202, facilitating the retrofit of strictly mechanical locks into smart locks that sense an operational position of the lockset 102. This is carried out by replacing the pre-existing spring retainer 20 and the pre-existing retract slide with an upgraded spring retainer 202, retract slide 302, and spring carriers 320 and 330.

3. Independently Detecting Positions of Spring Carrier and Deadlocking Plunger

FIGS. 11-14 are cross-sectional views of a third embodiment of a lockset 103. Unlike the first and second locksets 101 and 102, the third lockset 103 includes two switches 210 and 220. Switch 210 senses the position of the latchbolt 22, and switch 220 senses the position of the deadlocking plunger 30.

A significant difference between the lockset 103 and the lockset 102 is the addition of structure and a switch to detect the position of the deadlocking plunger 30. The deadlocking plunger 30 is a standard part of most exterior door latching mechanisms. It frustrates attacks that attempt to gain access through a locked door by carding the latchbolt 22. The deadlocking plunger 30 is depressed by the door strikeplate as a door is closed and held in that depressed position by a projection of the strikeplate into the strikeplate aperture. Even if the door does not fully close but simply is held ajar, the deadlocking plunger 30 is depressed by the strikeplate. While depressed, the plunger 30 blocks the latchbolt 22—if and after the latchbolt 22 has projected into the strikeplate hole—from retracting unless a door handle is operated to retract the retract slide 303.

Lockset 103 also features two separate spring sets 40 and 41. Springs 40 serve the same function in lockset 103 as they do in locksets 101 and 102—to bias the retract slide 300 toward its default, non-retracted position. Springs 40 bias the retract slide 303 toward its default, non-retracted position even when the spring carriers 320 and/or 330 are held by the tailpiece base 28 and/or deadlocking plunger 30 in a retracted position. Springs 41 directly bias the spring carriers 353 and 354 against the retract slide 303.

Figure 11:
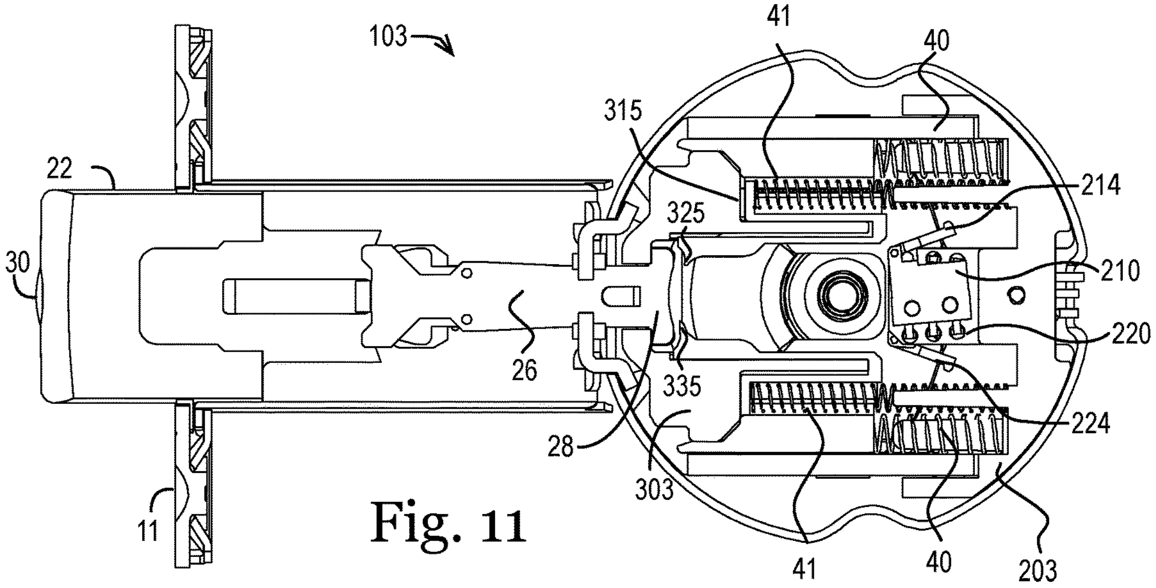
FIG. 11 is a cross-sectional view of a retract slide, spring carrier, and spring retainer assembly according to a third embodiment, in a configuration in which both the latchbolt and deadlocking plunger 30 are projected, as would occur when the door is open.
Figure 12:
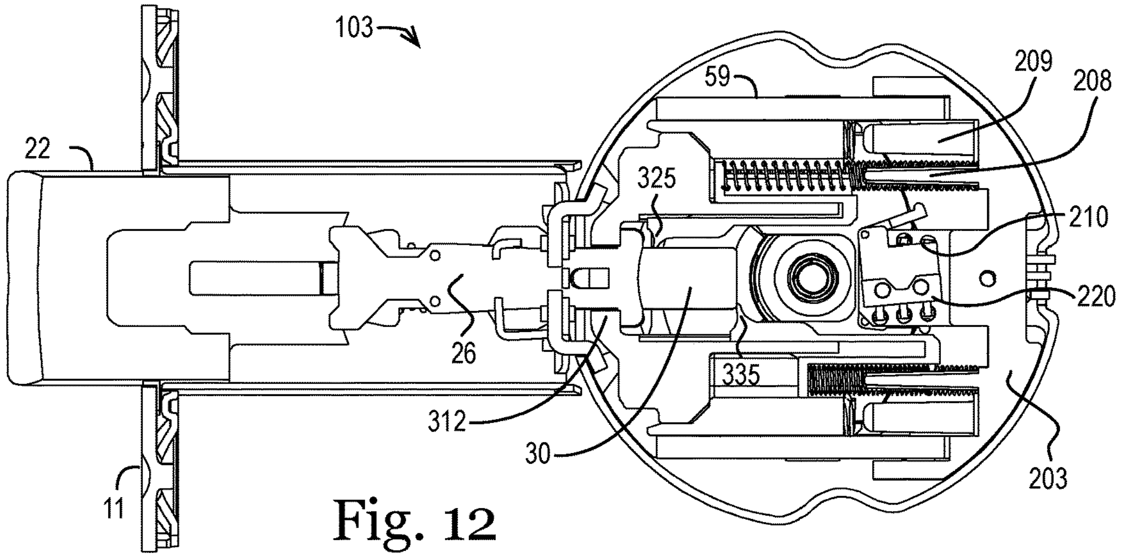
FIG. 12 is a cross-sectional view of the retract slide, spring carrier, and spring retainer assembly of FIG. 11, in a configuration in which the latchbolt is projected, but the deadlocking plunger is depressed, as would occur when the door is fully closed.
Figure 13:
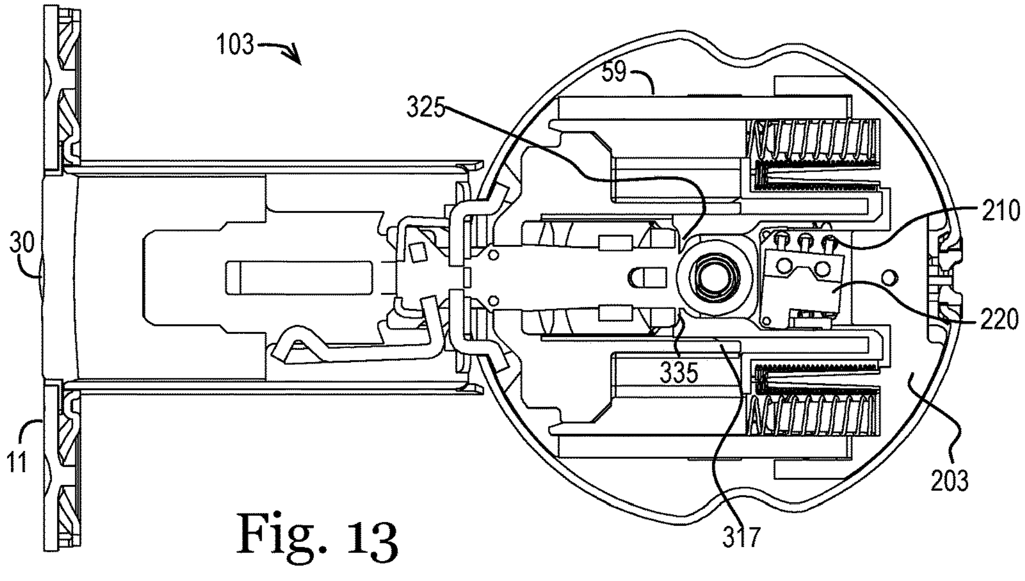
FIG. 13 is a cross-sectional view of the retract slide, spring carrier, and spring retainer assembly of FIG. 11, in a configuration in which both the latchbolt and deadlocking plunger are depressed, as would occur when the door is ajar.
Figure 14:
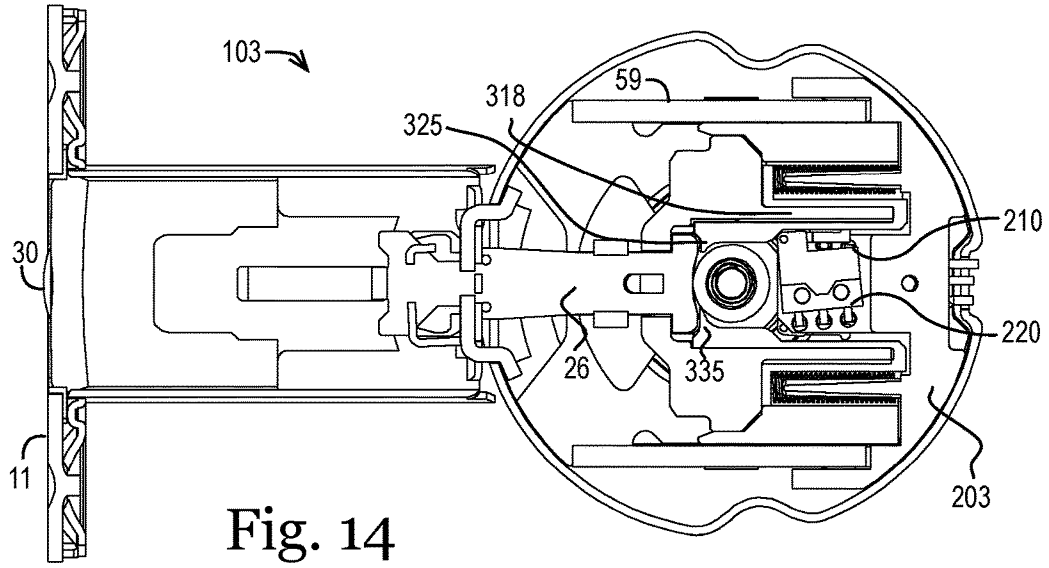
FIG. 14 is a cross-sectional view of the retract slide, spring carrier, and spring retainer assembly of FIG. 11, in a configuration in which both the retract slide, latchbolt and deadlocking plunger are all retracted.

FIG. 11 depicts the lockset 103 with both its latchbolt 22 and deadlocking plunger 30 projected, as they would be in an open door. In this position, neither of switches or sensors 210 or 220 is triggered. In other words, switches or sensors 210 and 220 are in composite binary state of (0,0). FIG. 12 depicts the lockset 103 with its latchbolt 22 extended, but its deadlocking plunger 30 depressed, as they would be if the door were fully closed, with the latchbolt 22 engaged in the strikeplate hole. In this position, the switch or sensor 220 is triggered, but switch or sensor 210 is not triggered. The binary state of switches or sensors 210 and 220 is (0,1). FIG. 13 depicts the lockset 103 with both its latchbolt 22 and its deadlocking plunger 30 depressed (retracted), even though the retract slide 303 is not activated (it is still in its default at-rest position). This configuration is consistent with the door being ajar (partially closed) on the strikeplate. In this position, both switches or sensors 210 and 220 are triggered. Switches or sensors 210 and 220 have a binary state of (1,1). FIG. 14 depicts the lockset 103 with both its latchbolt 22 and its deadlocking plunger 30 retracted by the retract slide 303. Like the FIG. 13 configuration, both switches or sensors 210 and 220 are triggered, producing a binary state of (1,1). The reason for sharing of a logical switch state to indicate two different physical states is discussed further below.

It will, of course, be understood that the 0's and 1's of these states could be reversed by substituting normally closed switches or their sensor equivalents for normally open switches, and perhaps making complementary changes to downstream Boolean logic. The description of the logic herein using 0's to represent open circuits and 1's to represent closed circuits merely follows convention.

Attention is directed to the feet 325 and 335 of the spring carriers 320 and 330, as best shown in FIG. 12. Both feet 325 and 335 project far enough into the tailpiece slot 310 to catch the tailpiece base 28 as it is pushed back. But feet 325 and 335 are not of equal length. When the latchbolt 22 is projected while the deadlocking plunger 30 is depressed, as it is in FIG. 13, the extra-long foot 335 of the spring carrier 330 catches an edge of the plunger 30 and is forced back into a retracted position. On the other hand, the plunger 30 scoots by the shorter foot 325 of spring carrier 320, so its corresponding switch or sensor 210 detects only whether the latchbolt 20 is projected or retracted.

Figure 15:
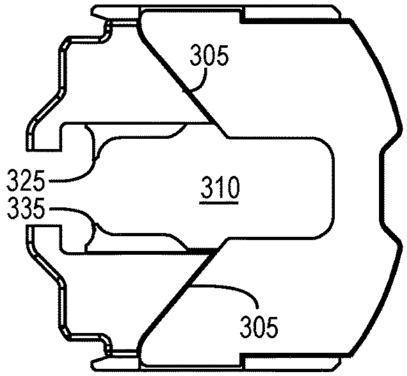
FIG. 15 is a side-facing plan view of the retract slide of FIG. 11 that also reveals the feet of otherwise concealed spring carriers mounted on the retract slide.
Figure 16:
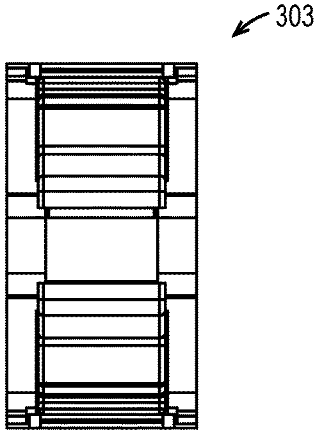
FIG. 16 is another plan view of the retract slide of FIG. 15, facing the mouth of the retract slide.
Figure 17:
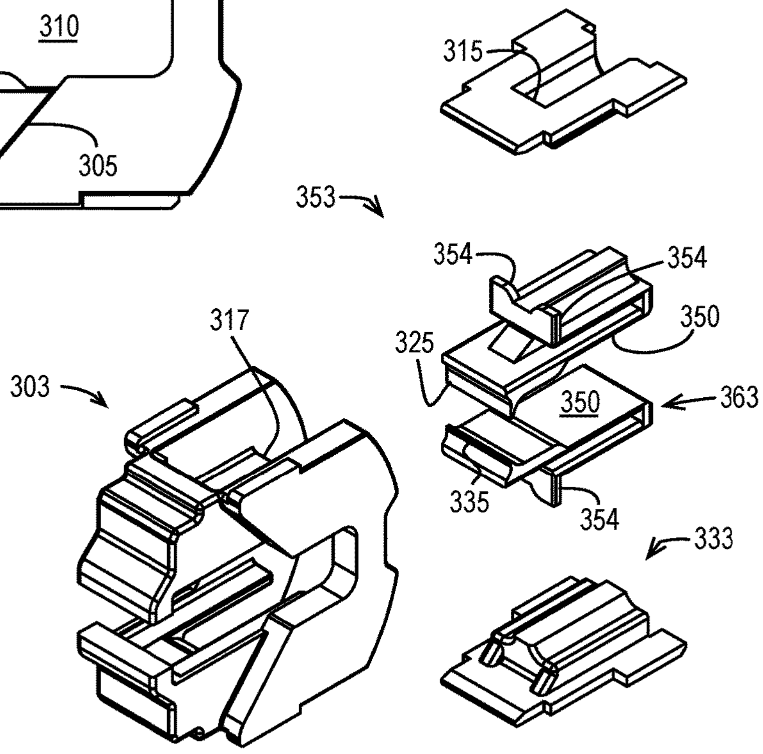
FIG. 17 is an exploded perspective view of a retract slide, its spring carriers, and separate switch or signal activators that mount to the spring carriers.
Figure 18:
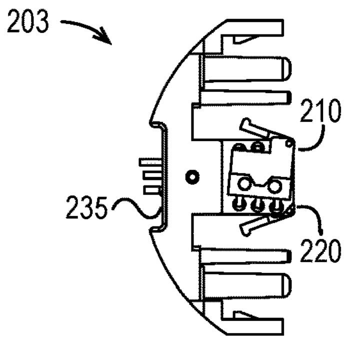
FIG. 18 is a side-facing plan view of a spring retainer of FIG. 11.
Figure 19:
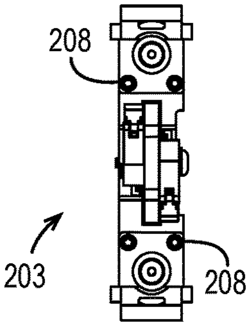
FIG. 19 is a bottom-facing plan view of the spring retainer of FIG. 18.
Figure 20:
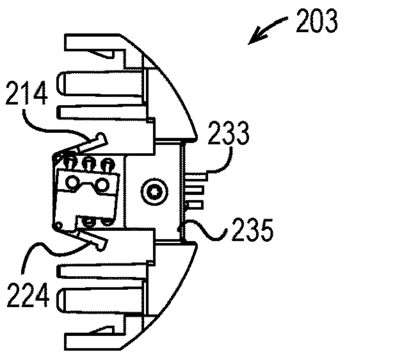
FIG. 20 is another side-facing plan view of the spring retainer of FIG. 11.
Figure 21:
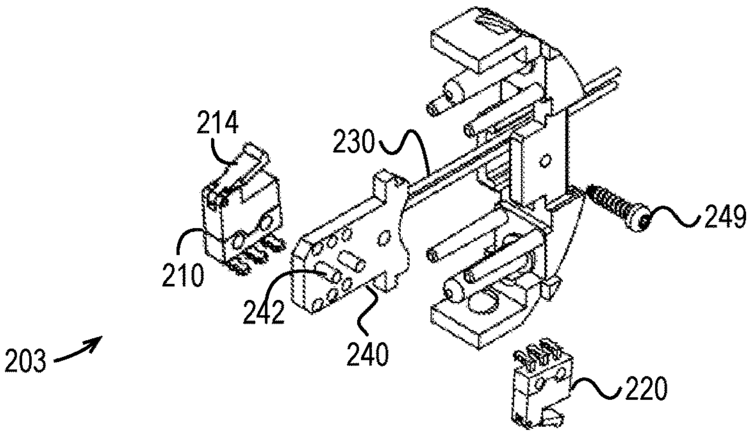
FIG. 21 is an exploded view of the spring retainer, platform, and switches of FIG. 18.
Figure 22:
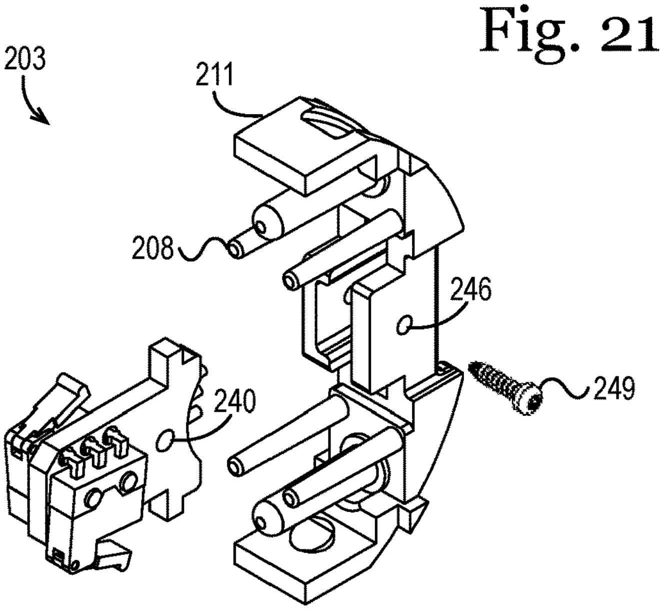
FIG. 22 is another exploded view of the spring retainer, platform, and switches of FIG. 21, showing the switches mounted to the platform.
Figure 23:
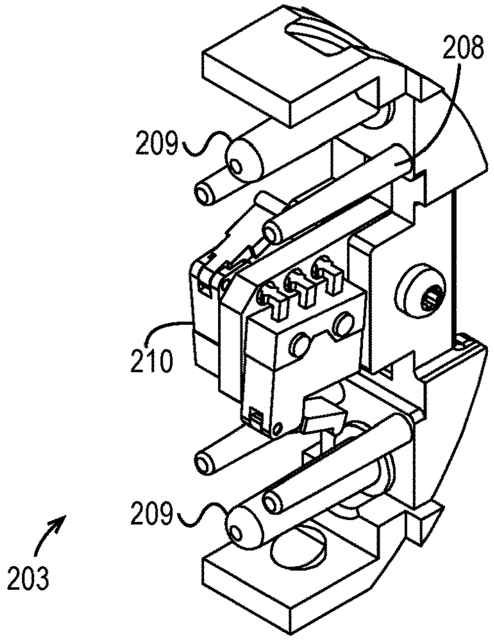
FIG. 23 is an assembled perspective view of the spring retainer, platform, and switches of FIG. 22.

FIGS. 15-17 illustrate the retract slide 303 and some accompanying components. FIGS. 15-17 differ from FIGS. 9 and 10 in that four spring carriers 323, 333, 353, 363 are provided instead of two. This allows lockset 103 to accommodate four additional biasing springs 41, two of which are seen in FIGS. 11-14, and the other two of which are concealed from that view. The spring posts 208 in FIGS. 22 and 23 reveal where the two concealed-from-view biasing springs 41 would be located. New spring carriers 353 and 363 each provide two spring seats 354 to receive and seat springs 41. The signal activators 350 and spring feet 325 and 335 are incorporated into the new spring carriers 353 and 363 instead of spring carriers 323 and 333, which continue to receive and seat springs 40.

The spring carriers 353 and 363 are formed with sleeves that receive bars 317 (FIG. 13) of retract slide 303, allowing the bars 317 to nest within the sleeves. In this manner, the spring carriers 323 and 333 ride the retract slide 303 whenever the retract slide 303 is operated into a retracting position (which is a first condition). The spring carrier 353 is also independently forced to retract when the tailpiece base 28 pushes the feet 325 and 335 of spring carriers 323 and 333 into a retracted position (which is a second condition). A third condition—the deadlocking plunger 30 being depressed—independently causes the spring carrier 363 to retract.

Springs 40 bias the spring carriers 323 and 333 forwards independently of springs 41 biasing the spring carriers 353 and 363 forwards, enabling the retract slide 303, the tailpiece 26, and the deadlocking plunger 30 to each independently activate one or the other of the switches or sensors 210 or 220.

FIGS. 18-23 illustrate various views of a spring retainer 203 integrated into the lockset 103 of FIGS. 12-14 and used to bias components of the retract slide assembly of FIGS. 15-17. The spring retainer 203 has a predominantly arcuate outer profile for fitting within a cylindrical housing and an inner profile in which cylindrical spring posts 208 and 209 descend from an orthogonal base. The platform 240 provides posts for snapping switches or sensors 210 and/or 220 into place. In a wired version of the platform 240, wires run from the platform 240 to some other portion of the lockset 103, where data is recorded and/or transmitted. In a wireless design, the platform 240 incorporates a transmission circuit and a power source (such as a button battery). In both the wired and wireless versions of the platform 240, the switches 210 and 220 are installed oppositely of one another, so that the lever 214 of the switch 210 and the lever 224 of switch 220 face opposite sides of the lock chassis 55.

After the switches or sensors 210 and 220 are snapped into place, the platform 240 is mounted into a channel of the spring retainer 203 and secured by a screw 249 or other fastener.

Figure 24:
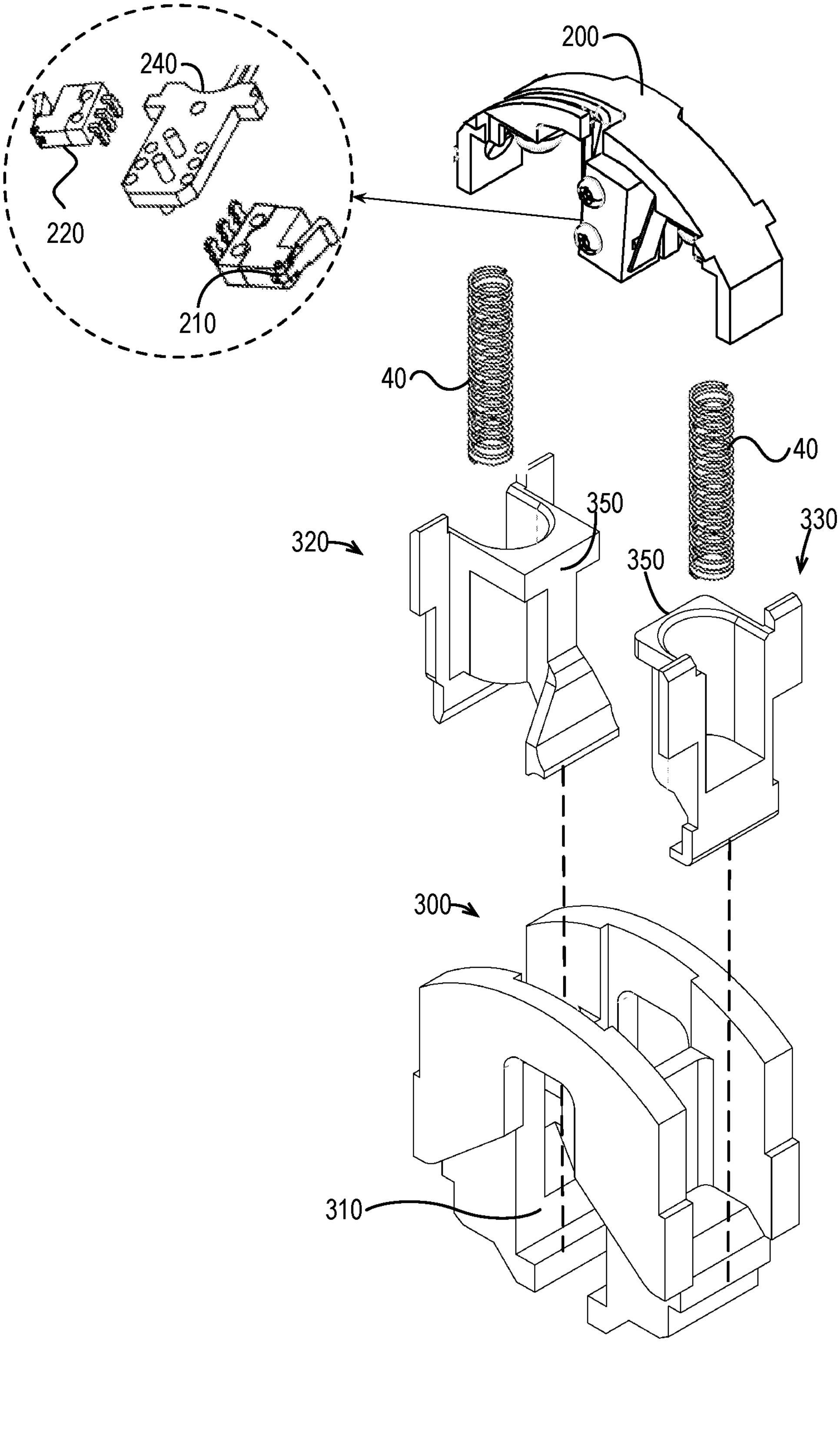
FIG. 24 is an exploded perspective view of one embodiment of an upgrade kit for upgrading a purely mechanical cylindrical lockset for a door to indicate a latch-retracted state.

FIG. 24 illustrates one embodiment of an upgrade kit comprising a replacement spring retainer 200, a platform 240, a first sensor 210, a second sensor 220, first and second sensor activators 350, a first carrier 320, a second carrier 330, and optionally also a replacement retract slide 300. The replacement spring retainer 200 is configured to replace a pre-existing spring retainer 20 (FIG. 2) of the cylindrical lockset. The platform 240 is configured to mount to or be pre-assembled to or formed as part of the replacement spring retainer 200. The platform 240 is also configured to secure (or is already pre-assembled with) the first and second position sensing sensors 210 and 220. The sensor activators 350 are formed as part of the carriers 320 and 330. When assembled to the cylindrical door lockset, the first sensor activator 350 is operative to move within the tailpiece slot 310 of the pre-existing or replacement retract slide 300 between positions that do or do not activate the first sensor 210. Retraction of the pre-existing or replacement retract slide 300 forces both the first and second carriers 320 and 330 and the first and second sensor activators 250 to move with it into sensor-activating positions. Independently, depression of the latch forces the first sensor activator 350 into a sensor-activating position, whereas depression of the deadlocking plunger forces the second sensor activator 350 into a sensor-activating position.

Using Logical States to Represent Physical States

Much can be inferred about the status of a door by differentiating the sensed values at switches 210 and 220, both statically and as a function of time. It will be observed that each of the retract slide 300, latchbolt 22, and deadlocking plunger 30 have retracted and non-retracted positions. Each of these can be characterized as physical states. If all of the physical states were completely independent, there would be 2^3 (eight) possible combined physical states. They are not independent, however. For example, when the retract slide 300 is retracted, the latchbolt 22 and deadlocking plunger 30 are also necessarily retracted. Also, anytime the latchbolt 22 is retracted—even if the retract slide 300 is not—the deadlocking plunger 30 is also necessarily retracted. This reduces the number of possible combined physical states to four, as shown in Table 1, below, where a binary 0 represents the default, spring-biased position of the member:

TABLE 1

The Legal Physical States of the Retract Slide, Latchbolt and Deadlocking Plunger and the Corresponding Logical States of the Third Embodiment's Switches

| Physical State (0 = default, 1 = retracted) | | | Logical Switch State (3rd Embodiment) | |
|---|---|---|---|---|
| Retract Slide | Latch bolt | Deadlocking Plunger | SW1 | SW2 |
| 0 | 0 | 0 | 0 | 0 |
| 0 | 0 | 1 | 0 | 1 |
| 0 | 1 | 0 (ILLEGAL) | | |
| 0 | 1 | 1 | 1 | 1 |
| 1 | 0 (ILLEGAL) | 0 (ILLEGAL) | | |
| 1 | 0 (ILLEGAL) | 1 | | |

TABLE 1-continued

The Legal Physical States of the Retract Slide, Latchbolt and Deadlocking Plunger and the Corresponding Logical States of the Third Embodiment's Switches

| Physical State (0 = default, 1 = retracted) | | | Logical Switch State (3rd Embodiment) | |
|---|---|---|---|---|
| Retract Slide | Latch bolt | Deadlocking Plunger | SW1 | SW2 |
| 1 | 1 | 0 (ILLEGAL) | | |
| 1 | 1 | 1 | 1 | 1 |

In the third embodiment, only two switches are used, as shown in Table 1. They are configured in a manner that produces three logical non-error states to represent selected ones or combinations of four possible legal physical states. In another embodiment, not depicted in the drawings, three switches are used to represent each of the above possible legal states. This comes at the expense of added structural complexity.

Table 1 above illustrates the spatial states of the retract slide, latchbolt, and deadlocking plunger in a static sense. Door and switch conditions can be represented not only in static spatial states, but also in temporal-spatial states. Table 2 below lists a plurality of static and dynamic switch states and summarizes their indications.

TABLE 1

Situations inferred from door switch/sensor states and state progressions

| Static or Dynamic Switch State | What it Indicates |
|---|---|
| 0 (1st embodiment) | The door handles are in their default, non-latch-retracting position. |
| 1 | A door handle has been operated to retract the latch. |
| 0 (2nd embodiment) | The latchbolt is projected. |
| 1 | The latchbolt is depressed. |
| 0, 0 (3rd embodiment) | The latchbolt and deadlocking plunger are both extended, suggesting that the door is open. |
| 0, 1 | The latchbolt is extended, but the deadlocking plunger is depressed. Most likely, the door is fully closed, but someone could be depressing the deadlocking plunger. |
| 1, 0 | Error condition |
| 1, 1 | The latchbolt and deadlocking plunger are both depressed, indicating either that the retract slide is activated or that the door is ajar. |
| (0, 0) to (1, 1) to (0, 1) | The door has just been closed with or without engaging the door handle. |
| (0, 0) to (1, 1) to (0, 1) fast | The door has just been slammed shut. |
| (0, 1) to (1, 1) to (0, 0) | The door has just been opened. |
| (0, 0) to (0, 1) to (0, 0) to (0, 1) . . . | Child present!-someone is playing with the deadlocking plunger. |

It is noted that state (1,0) represents an error condition, because when the latchset 103 is in good condition, it should not be possible for the deadlocking plunger 30 to be projected (state 0) while the latchbolt is depressed (state 1).

Lockset kits are envisioned comprised of various combinations of the novelties discussed in this specification. Various electronic activators, sensors, switches, controllers, and other devices may be employed with the locksets and their components. Parts may be made of various materials as warranted, including metal, carbon, polymers, and composites.

It will be understood that many modifications could be made to the embodiments disclosed herein without departing from the spirit of the invention. For example, it may be observed that the second embodiment uses a spring carrier 320 that nests in and rides on spring seats 315 of the retract slide 302. By contrast, the third embodiment provides a retract slide 303 with a bar or other structural feature 317 that nests within a sleeve of a spring carrier 320. With both the second and third embodiments, any pair of such nesting members is characterized by three physical states—either both members of the nesting pair are retracted, both members are not retracted, or just one of the members is retracted. There are many different ways these nesting pairs can be configured. No matter how they are configured, using the two switch states (i.e., closed or open) of a single switch to monitor all three physical states means some information is sacrificed. Accordingly, the design of the nesting configuration should take into account which two physical states (e.g., the retract slide is being operated to retract and/or the latchbolt is being depressed) are most practically summarized by a single logical state. Also, a fourth embodiment, not shown, replaces the use of nesting members with stacked switch activators (e.g., bars or plates that slide against each other) that move in parallel with each other between switch-activating and non-activating positions with their against the switch lever 214. Movements of these stacked activators are independent of each other—the movement of one plate does not result in the movement of another plate.

Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein but is limited only by the following claims.

We claim:

1. A lockset with a latch-position sensing and retract slide assembly comprising:
- a chassis sized to fit within a bore of a door;
- a retract slide operatively connected to a door handle and a latchbolt and mounted in the chassis for movement between latch-retracting and non-latch-retracting positions;
- a spring retainer;
- one or more latch springs held between the retract slide and the spring retainer;
- a first sensor mounted on the spring retainer; and
- a first signal activator formed on or carried by the retract slide between sensor-activating and sensor-deactivating positions;
- wherein when the retract slide is operated to retract the latch, the first signal activator moves between the sensor-activating and sensor-deactivating positions, thereby interacting with the first sensor to indicate a latch-retracted state.

2. The lockset of claim 1, wherein the first sensor is a switch.

3. The lockset of claim 1, further comprising a first spring carrier positioned between the retract slide and the spring retainer, wherein:
- the first signal activator carried by the retract slide is formed as part of or operatively connected to the first spring carrier;

the first spring carrier is configured in relation to the retract slide to be driven with the retract slide into the sensor-activating position by manual operation of the door handle;

retraction of the latch via operation of a door handle on the retract slide moves the first signal activator into a position that activates the first sensor;

the first spring carrier is independently operable to be driven by a tailpiece of the latch into the spring-compressing position; and the first signal activator activates the first sensor when the latch is pressed inward by a strikeplate to indicate that the latch is in a retracted state.

4. The lockset of claim 1, further comprising:

a second sensor mounted on the spring retainer;

a second spring carrier positioned between the retract slide and the spring retainer, the spring carrier configured, in relation to a deadlock plunger, to be driven by the deadlock plunger into a spring-compressing position; and the second spring carrier including or bearing a second signal activator;

wherein the second signal activator interacts with the second sensor when the deadlock plunger is pressed inward to indicate that the deadlock plunger is pressed inward.

5. An upgrade kit for upgrading a purely mechanical cylindrical lockset for a door to indicate a retracted state of a latch, the upgrade kit comprising:

a replacement spring retainer configured to replace a pre-existing spring retainer of the cylindrical lockset;

a platform configured to mount to or formed as a part of the replacement spring retainers;

first and second position-sensing sensors that are configured to be secured to the platform;

first and second carriers configured to ride a pre-existing retract slide of the mechanical cylindrical lockset or a replacement retract slide and press and relax latch springs that are oppositely secured by the replacement spring retainer between compressed and relatively decompressed positions;

first and second sensor activators configured to be assembled to a pre-existing retract slide of the cylindrical lockset, to a replacement retract slide included in the upgrade kit, or to the first and second carriers, respectively;

whereupon assembly to the cylindrical lockset:

the first and second sensor activators are supported on or formed as a part of the first and second carriers, respectively;

the first sensor activator is operative to move within a tailpiece slot of the pre-existing or replacement retract slide between a position that activates the first sensor and a position that does not activate the first sensor;

the first sensor activator is configured for contact with a latch tailpiece of the cylindrical lockset so that depression of the latch pushes the first sensor activator into the position that activates the first sensor;

the second signal activator is configured for contact with a deadlocking plunger of the cylindrical lockset so that depression of the deadlocking plunger pushes the second sensor activator into a position that activates the second sensor;

retraction of the pre-existing or replacement retract slide forces the first carrier and first sensor activator to move with it into the position that activates the first sensor and the second carrier and second sensor activator to move with it into the position that activates the second sensor.

6. The upgrade kit of claim 5, further comprising said replacement retract slide.

7. A smart latchset comprising:

a retract slide;

a chassis housing the retract slide, the chassis configured to fit within a standard door bore for a lockset;

a latch assembly comprising a latchbolt, a tailpiece, a tailpiece base configured to be received in a tailpiece slot of the retract slide, and a deadlocking plunger;

one or more springs biasing the retract slide toward a default, non-retracting position;

a spring retainer that retains the one or more biasing springs between the spring retainer and the retract slide; and a first sensor mounted on the spring retainer that signals a first state of the door and/or latchset;

a second sensor that signals a second state of the door and/or latchset, that being whether the deadbolt plunger is depressed.

8. The smart latchset of claim 7, wherein the first sensor signals whether the retract slide is retracted.

9. The smart latchset of claim 7, wherein the first sensor signals whether the latchbolt is retracted, regardless of whether the retract slide is retracted.

10. The smart latchset of claim 7, wherein the first and second sensors are mounted on the spring retainer.

11. The smart latchset of claim 7, wherein the first and second sensors signal whether the door is open or closed.

12. The smart latchset of claim 7, wherein the first and second sensors signal when the door is ajar.

13. The smart latchset of claim 10, wherein the spring retainer is configured to retrofit a pre-existing mechanical, non-electrical latchset by replacing a pre-existing spring retainer of the pre-existing mechanical, non-electrical latchset.

14. A retract slide assembly for a latch-position sensing lockset, the retract slide assembly comprising:

a retract slide configured for coupling to a latch and for mounting in a chassis of the lockset for movement between latch-retracting and non-latch-retracting positions;

a first signal activator formed in or carried by the retract slide and configured for movement driven by a latch tailpiece from a first position to a second position;

wherein the first signal activator interacts with a first sensor when the latch is retracted via the retract slide and when the latch is pressed inward by a strikeplate to indicate that the latch is retracted or pressed inward.

15. The retract slide assembly of claim 14, further comprising:

a spring, wherein the first signal activator is configured for movement driven by the spring from the second position to the first position;

a spring retainer configured for mounting within the chassis of the lockset; and a first spring carrier positioned between the retract slide and the spring retainer, having a first contact area for being driven by the retract slide and a second contact area for being driven by a latch tailpiece;

wherein the second contact area is inside a slot formed by the retract slide by which the latch tailpiece is coupled to the retract slide.

* * * * *